United States Patent [19]

Dolan

[11] Patent Number: 4,862,625

[45] Date of Patent: Sep. 5, 1989

[54] REMOTELY CONTROLLED TURKEY CALLING DEVICE

[76] Inventor: Rex H. Dolan, Hwy. 80 and 4th Ave., Forest, Mich. 39074

[21] Appl. No.: 275,892

[22] Filed: Nov. 25, 1988

[51] Int. Cl.$^4$ ............................................. A01M 31/04
[52] U.S. Cl. ............................................ 43/1; 446/397
[58] Field of Search ........................ 43/1, 2; 446/397

[56] References Cited

U.S. PATENT DOCUMENTS

| | | |
|---|---|---|
| 2,573,856 | 11/1951 | Malone . |
| 3,172,223 | 3/1965 | Stager . |
| 4,343,108 | 8/1982 | Lee .................................. 446/397 |
| 4,606,733 | 8/1986 | Willis ............................... 446/397 |
| 4,637,154 | 1/1987 | Laubach ................................ 43/1 |
| 4,648,852 | 3/1987 | Wingate ......................... 446/397 |
| 4,664,641 | 5/1987 | Hearn et al. ................... 446/397 |

*Primary Examiner*—Nicholas P. Godici
*Assistant Examiner*—Michael William Starkweather
*Attorney, Agent, or Firm*—Laubscher, Presta & Laubscher

[57] ABSTRACT

A remote control operator for a game-calling device includes a push-pull cable connected at one end with the game-calling device and a trigger/pistol combination connected with the other end of the device for axially displacing the inner core member of the cable relative to the outer sheath thereof. The inner core is connected at one end with the actuator of the game calling device and at the other end with the trigger member of the displacement mechanism. The outer sheath is fixedly connected with the housing of the game-calling device at one end and at the other end with the pistol. Upon operation of the trigger, the inner core is axially displaced relative to the outer sheath, thereby to provide a push-pull operation to the acutator member of the game calling device. Upon operation of the actuator of the game-calling device, sounds are generated to simulate the prey of the hunter.

5 Claims, 1 Drawing Sheet

REMOTELY CONTROLLED TURKEY CALLING DEVICE

BACKGROUND OF THE INVENTION

The turkey is one of the most astute, keen-eyed game birds in the world. Thus, in addition to its source as a food product, the turkey is a popular target for hunters since it has proven to be among the most elusive, and thus difficult to shoot.

To assist the hunter in locating a turkey, resort is often had to a turkey-calling device which is operable to emit a sound simulating the gobble of a turkey. Hopefully, the turkey is lured toward the hunter by the sounds produced by the calling device. Once in range and assuming the turkey has not spotted the hunter, the hunter is able to fire a shot at his prey. Owing to the keen eyesight of the turkey, however, the hunter is often spotted by the turkey before the hunter can locate and fire upon his target.

The present invention relates to a remote control for a turkey or other game calling device. By using the invention, the hunter can camouflage himself at a remote location from the calling device, preferably a location having good sight lines to the calling device. Upon operation of the caller, a turkey may be drawn into the caller area, with a lesser chance of the hunter being spotted. Thus the hunter has an increased chance of getting his prey.

BRIEF DESCRIPTION OF THE PRIOR ART

Turkey calling devices are well-known in the patented prior art. The Malone U.S. Pat. No. 2,573,856, for example, discloses a turkey caller including a housing, a trigger-type actuator, and tone-producing means for producing a sound within the housing resulting from friction of a reed which is vibrated upon movement of the trigger. The caller is not operable from a remote location.

Also known in the art are remotely operated decoys. In the Stager U.S. Pat. No. 3,172,223, for example, there is disclosed a muskrat call and decoy wherein air pressure is used to operate the calling device and also to move the forelegs on decoy providing the effect of movement of the decoy to attract another muskrat. This device does not provide the push-pull movement for operation of turkey callers. Moreover, because the device generates only a limited amount of air pressure, it is unsuitable for operation more than a few feet from the decoy.

The present invention was developed in order to overcome these and other drawbacks of the prior devices by providing a remote control actuator assembly for a turkey caller which is operable at locations of fifty feet or more from the calling device.

SUMMARY OF THE INVENTION

Accordingly, it is a primary object of the present invention to provide a device for remotely operating a game-calling device such as a turkey caller having a fixed housing, and a movable actuator for producing a sound from the housing. The invention includes a flexible push-pull cable including a hollow outer sheath and an elongated inner core member axially displaceable within the sheath. At one end of the flexible push-pull cable, the sheath is connected with the game-calling device and the core member is connected with the actuator of the device. At the other end of the cable is connected a pistol-type displacement mechanism operable to displace the core relative to the sheath. Upon operation of the pistol, the actuator of the game-calling device is operated to emit sound therefrom.

According to a more particular object of the invention, the pistol includes a spring biased trigger pivotally connected with the pistol housing. The trigger is connected with the core member of the push-pull cable, so that the trigger is manually operable against the force of the spring biasing means to displace the core in one axial direction with the spring biassing the core member in the opposite axial direction to provide the push-pull displacement necessary to operate the turkey caller.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
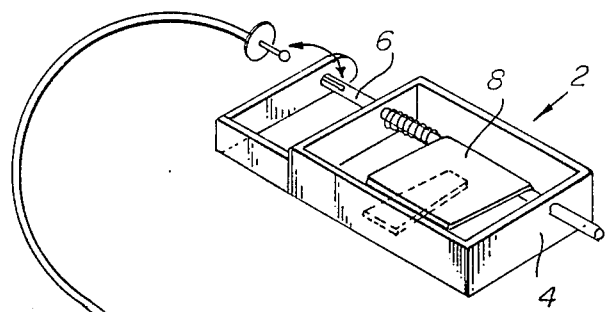
FIG. 1 is a representation of the remote control device according to the invention for operating a turkey caller.
Figure 2:
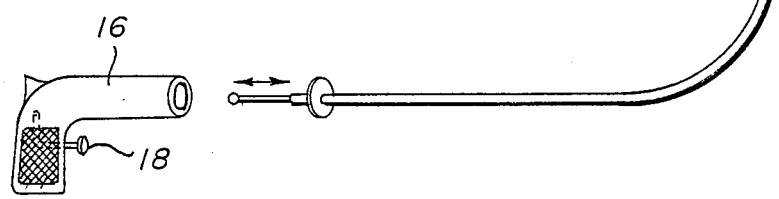
FIG. 2 is a sectional view through the push-pull cable of the remote control device of FIG. 1.

As shown in FIG. 1, a conventional turkey calling device 2 is provided including a housing 4 and an actuator 6 which is laterally displaced relative to the housing 4 to operate a reed-type mechanism 8 within the housing. Vibration of the reed 8 produces a sound which resonates from the turkey caller housing 4 and simulates the sound normally made by turkeys. Connected with the turkey calling device 2 is the remote control apparatus according to the invention. This apparatus includes a push-pull cable 10 having an outer sheath 12 and an inner core 14 as shown more particularly in FIG. 2. The push-pull cable is flexible in nature and may have a length on the order of 50 feet or more. The outer sheath is preferably formed of a synthetic plastic material and the inner core is formed of any suitable flexible material such as metal or synthetic plastic which does not stretch along its length. The inner core is axially displaceable relative to the outer sheath.

Referring once again to FIG. 1, the outer sheath is preferably connected directly with the housing 4 of the turkey calling device 2, with the inner core 12 being connected with the acutator 6 of the turkey calling device. At the other end of the push-pull cable 10, there is provided a pistol 16 which is operable to displace the inner core member 14 relative to the outer sheath 12 of the push-pull cable 10.

Figure 3:
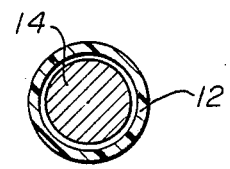
FIG. 3 is a detailed sectional view of the pistol-type displacement mechanism for operating the push-pull cable of the invention of FIG. 1.

Referring now to FIG. 3, the preferred construction of the pistol displacement member 16 will be described. The pistol includes a trigger 18 which is connected with the pistol housing via a pivot pin 20. The outer sheath of the push-pull cable is connected with the pistol, and the inner core 14 is connected with the trigger 18 as shown in FIG. 3. A spring 22 is arranged between the housing pistol 16 and the rear surface of the trigger 18.

In operation, the hunter grips the pistol in one hand and depresses the trigger 18 relative to the pistol by pushing on the trigger with his finger. Depression of the trigger causes the trigger to pivot about the pivot pin 20 and to push the inner core member 14 toward the far end of the push-pull cable relative to the outer sheath 12 which is fixed. Thus at the turkey calling device where the outer sheath 12 is fixed to the housing of the caller, the inner core 14 pushes the actuator 6 inwardly with respect to the calling housing 4 to vibrate the reed 8 to produce sound. Release of the trigger 18 by the hunter's finger enables the spring 22 to bias the trigger about the pivot pin 20 whereby the trigger 18 pulls the core member 14 relative to the sheath 12. At the calling device, the actuator 6 is drawn outwardly of the housing 4 of the calling device to again vibrate the reed 8 and to produce a further sound simulating that of a turkey. Repeated manual operation of the trigger 18 and the biasing movement of the return spring 22 provides the push-pull movement necessary to repeatedly operate the turkey calling device 2 as desired.

Because the pistol 16 may be located a significant distance (i.e. on the order of 50 feet or more) from the location of the turkey calling device, the hunter is able to position himself at a remote location from the calling device, thereby minimizing the chance that the hunter will be spotted or sensed by his prey.

While the invention has been described with reference to a turkey calling device, it is apparent to those skilled in the art that the remote control operator of the device may be used for any suitable game-calling mechanism requiring push-pull movement for operation.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. Apparatus for remotely operating a game-calling device such as a turkey caller including a fixed housing and a movable actuator, comprising
   (a) a flexible push-pull cable including a hollow sheath and an elongated core member axially displaceable within said sheath, said sheath being connected at one end of said cable with the housing of the game-calling device and said core member being connected at said one cable end with the acutator of the device; and
   (b) means at a remote location from the device connected with the other end of said cable for displacing said core relative to said sheath, whereby upon operation of said displacing means, the actuator of the game-calling device is operated to emit sound from the device.

2. Apparatus as defined in claim 1, wherein said displacing means comprises a pistol connected with said sheath, said pistol including a trigger pivotally connected therewith, said trigger being connected with said core member.

3. Apparatus as defined in claim 2, wherein said pistol further comprises means normally biassing said trigger in one direction of pivotal movement, said trigger being manually operable against the force of said biassing means to displace said core in one axial direction and said biassing means displacing said core member in the opposite axial direction.

4. Apparatus as defined in claim 3, wherein said biassing means comprises a spring connected between said pistol and said trigger.

5. Apparatus as defined in claim 4, wherein said sheath is formed of synthetic plastic material.

* * * * *